3,337,452
PROCESS FOR THE PURIFICATION OF WASTE WATER

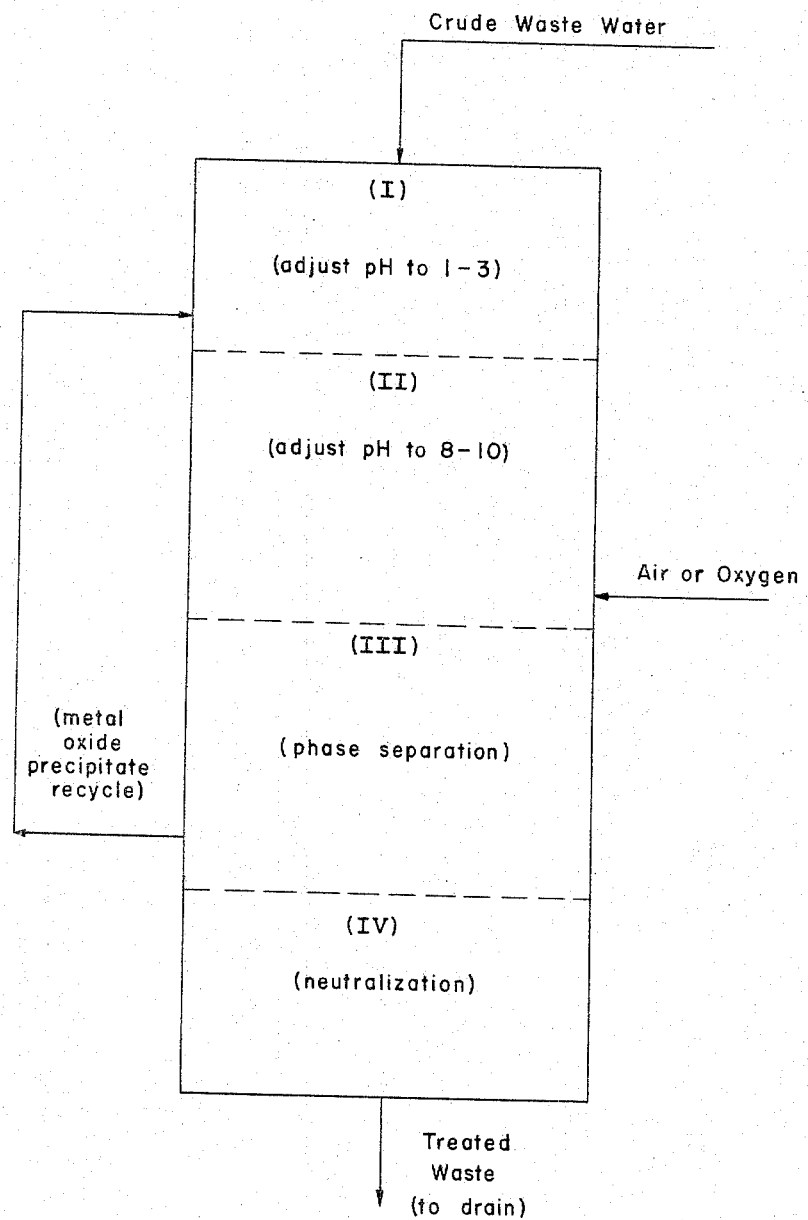

Wolfgang Teske, Bad Soden, Taunus, and Erich Ringel, Frankfurt am Main, Germany, assignors to Farbwerke Hoechst Aktiengesellschaft vormals Meister Lucius & Bruning, Frankfurt am Main, Germany, a corporation of Germany
Filed Jan. 4, 1965, Ser. No. 423,068
Claims priority, application Germany, Jan. 3, 1964, F 41,668
1 Claim. (Cl. 210—45)

The present invention relates to a process for the purification of waste water.

It is the object of the present invention to liberate waste waters as completely as possible from oxygen-consuming impurities or to remove these impurities by partial oxidative decomposition in order to facilitate the following biological purification of the waste waters, which also enables the use of smaller biological purification installations.

As is well known, a considerable part of the waste waters, especially industrial sewage, contains as impurities dissolved inorganic and/or organic substances which cannot directly be removed by simple mechanical separation processes such as, for example, sedimentation, filtration and the like and thus impede or impair the self-purifying capacity of the draining ditch (brooks, rivers, lakes) into which said waste waters are finally drained, either by direct toxic action or by excessive consumption of the oxygen supply of the draining ditch which is a prerequisite for its biological self-purification. It is known that certain types of these waste waters can be subjected to a biological purification treatment prior to being discharged into a draining ditch. These processes have been used for a long time especially in municipal waste water purification. It is also possible to subject certain types of industrial sewage from the food- and textile industries to a biological purification in the same manner. It is likewise possible to subject some of the waste waters of the petroleum industry to a biological treatment.

Difficulties are encountered, however, when desiring to subject to such a final biological purification a variety of waste waters obtained in the chemical industry especially when these waste waters are obtained in large production plants whose manufacturing program comprises a wide variety of products, said waste waters having not only a non-uniform composition but being obtained at different periods and in different quantities. In this case it is necessary to subject the waste water to a purification in relatively large fluid reservoirs provided, if necessary, with pretreatment stages, prior to subjecting the waste water to a biological treatment (if such a treatment can be carried out at all), or to effect a more or less thorough preliminary purification of the locally obtained types of waste water in the individual plants or groups of plants before the sewage can be conducted to a central final purification stage.

Biological installations can, as is known, be operated in a relatively simple manner if the waste water has been treated in a suitable manner; however, they require much space. Furthermore, the composition of the waste water must not be subject to large fluctuations, that is to say a biological installation needs a rather long period of adaptation to get adjusted to such fluctuations. Finally there presents itself in many cases the problem of how to store or destroy the continuously growing bacterial sludge.

Regard must also be had to the fact that quite a number of industrial waste waters cannot be subjected to a biological treatment at all. Attempts have already been made to burn the impurities of such waste waters in the wet state by heating them under pressure while simultaneously forcing in oxygen under pressure, which process is successfully applied in individual cases for destroying municipal activated sludge, in which case, however, pressures of 150 atmospheres gage and temperatures of 300° C. have to be applied. However, especially corrosion problems still prevent this known process from being directly applied to sewage containing chemical impurities.

Now we have found a process for the purification of waste waters from dissolved, oxidizable impurities by oxidative decomposition thereof, which process solves the problem involved in a very advantageous manner and constitutes an advance in the art of purifying waste waters while avoiding the disadvantages of the aforesaid processes. According to the process of the invention, the waste waters are treated with oxides or hydroxides of metal occurring in at least two different valency stages, the higher valency stage of which has a sufficient oxidation potential with respect to the impurities to be removed, and the lower valency stage of which is capable of being reoxidized to the higher valency stage by oxidants with simultaneous precipitation in the form of a difficultly soluble deposit, at temperatures within the range of about 50° C. to the boiling point of the waste waters, preferably at temperatures exceeding about 80° C. The oxides or hydroxides that have passed to the lower oxidation stage with reoxidation to the higher valency stage by means of a suitable oxidant are precipitated from the waste water treated, separated therefrom in known manner and reused for the treatment of further waste waters.

The impurities contained in the waste water are oxidized or decomposed by oxidation by treating the waste water according to the process of the invention in the first stage with metal oxides or metal hydroxides the metals of which have a sufficient oxidation potential with respect to the impurities. The metal oxides or metal hydroxides are advantageously caused to act upon the waste water while acidifying, heating and intermingling the latter.

For the treatment of the waste waters, there are fundamentally suitable all oxides or hydroxides which possess the aforesaid properties. The oxides or hydroxides of manganese, cerium and lead have proved especially useful.

The amount of the oxide or hydroxide of the higher valency stage to be used depends primarily on the type of waste water to be purified, that is to say especially on the amount of impurities that is contained in the waste water and has to be removed therefrom. By determining the requirement of permanganate of the waste water to be treated, the amount of oxide or hydroxide to be used for the respective waste water can easily be ascertained by simple preliminary tests. It can generally be said that the amount of the oxide or hydroxide should not be less than 0.1 g./l. of the waste water. The range most commonly to be used in practice comprises about 1.0 to about 50 grams of oxide or hydroxide per liter of waste water.

An especially advantageous modification of the process according to the invention consists in effecting the oxidative decomposition of the impurities to be removed with manganese and/or cerium dioxide or the hydrates thereof in the acid range, preferably at a pH of about 1 to about 3, and effecting the reoxidation with simultaneous precipitation of the oxides or hydroxides in the alkaline range, preferably within a range of from about 8 to about 10, with the use of air or oxygen as oxidant. The temperature at which the reoxidation of the oxides or hydroxides should be carried out is not critical so that the temperatures to be applied may range from room temperature to the boiling temperatures of the waste waters.

The use of lead dioxide as oxidant has likewise proved advantageous. Also in this case the oxidative decomposition of the impurities is advantageously carried out at a pH within the range of about 1 to 3, and reoxidation and precipitation of the oxide or hydroxide are advantageously carried out in the alkaline range at a pH within the range of about 8 to about 10, in which case, however, chlorine or sodium hypochlorite is used as oxidant for the reoxidation, possibly only after the oxides or hydroxides have been separated from the waste waters treated. For the reoxidation of the oxides or hydroxides by means of chlorine or sodium hypochlorite the temperature applied is not critical either.

Now we have found, and this being unexpected, that the action of the oxides or hydroxides used according to the present invention can be increased considerably when the waste water is treated with these oxides or hydroxides in the presence of a soluble cupric compound or cupric oxide. Depending on the type of the waste water, noticeable effects are obtained when these substances are applied in an amount within the range of about 0.5 g./l. of waste water up to about 10 g./l. of waste water.

The flow sheet shown in the accompanying drawing illustrates how the process of the present invention is carried out in practice.

According to this flow sheet, the pH of the crude waste water to be treated is adjusted in stage I (if necessary after a mechanic preliminary purification) to a value within the range of about 1 to about 3 by the addition of an acid (for which purpose residuary acids may advantageously be used), and the waste water is maintained in the presence of the metal oxide or metal hydroxide of the higher oxidation stage at a temperature within the range of about 50° C. to 100° C., preferably with agitation and steam heating.

In stage II, the pH of the mixture is adjusted to a value within the range of about 8 to 10 by means of an alkali, for example sodium hydroxide solution or burnt or slaked lime while simultaneously blowing in air or oxygen, whereby the metal oxides present in the lower valency stage, which may also have been dissolved in said valency stage, are simultaneously oxidized and precipitated.

The precipitate, if necessary after a partial preliminary neutralization of the mixture, is separated in stage III from the treated waste water in known manner, for example by sedimentation, filtration or centrifuging, and reconducted to stage I for the treatment of further amounts of waste water.

The treated waste water from stage III is, if necessary, completely neutralized in stage IV and may then be drained off into the draining ditch or, if necessary, into a central biological purification installation, either undiluted or diluted with other suitable waste waters or cooling waters, which depends on the absolute amount of the waste water and the purification degree attained.

If lead dioxide is used as oxidant, the reoxidation of the lead dioxide that has been reduced to the lower valency stage must be effected by means of chlorine or hypochlorite, advantageously in a separate operation after the separation in stage III.

It is, of course, possible to carry out the process according to the invention in a fully continuous manner.

An essential advantage of the process according to the invention is, inter alia, that it is suited for the decomposition of oxygen-consuming impurities which, owing to their nature or concentration, cannot be subjected to a biological treatment. Waste waters containing higher concentrations of phenol, for example, cannot directly be subjected to a biological treatment. On the other hand, the purification of such waste waters by means of chlorine or hypochlorite leads to the formation of chlorophenols, which even increases the contamination of the waste waters since these chlorophenols adversely affect the treatment even in very small concentrations.

It has been found that in the treatment of the waste waters according to the process of the invention tetravalent hydrated oxides of manganese have proved especially useful (cf. Example 5).

It has, moreover, to be stated that owing to the excess of chlorine that cannot be avoided in most cases a chlorination of the waste water has drawbacks as regards the undisturbed operation of a possibly associated biological purification stage, which drawbacks are avoided by the process of the present invention.

Another advantage of the process according to the invention is that it is to a large extent independent of higher salt concentrations and low outdoor temperatures which both adversely affect a biological purification treatment, and thus advantageously complements the oxidizing chemical purification treatments such as, for example, chlorination and the expensive treatment with ozone which are being used at present. The process of the present invention can also be associated to individual plants or groups of plants as preliminary purification stage, possibly also as final purification stage.

The following examples serve to illustrate the invention but they are not intended to limit it thereto:

In all working examples care was taken that the impurities could not—by evaporation or volatilization—evade the oxidizing action of the oxidant applied in each instance. In order to distinguish the waste waters used and the purification effect attained by the purification treatments, the consumption of potassium permanganate usual in these treatments and the biological demand of oxygen ($BOD_5$) were determined in the examples by the methods standardized for these treatments. The biological demand of oxygen indicates the amount of oxygen consumed by microorganisms during the oxidative decomposition of organic substances, for example during a period of five days. (cf. "Deutsche Einheitsverfahren zur Wasseruntersuchung," edition Chemie, Weinheim, Bergstrasse).

*Example 1*

Two liters of waste water discharged by a large petrochemical installation and containing as main impurities benzene and the homologs thereof was boiled in a flask provided with reflux condenser with 50 grams of hydrated dioxide of manganese for 20 minutes at a pH that had been adjusted to 1 to 2 by means of hydrochloric acid. The manganese that had partially passed into solution as bivalent ion was then precipitated with sodium hydroxide solution as $Mn(OH)_2$ in the alkaline range of 8 to 10 and reoxidized into hydrated dioxide of manganese by passing in air for half an hour. The sediment of hydrated dioxide of manganese that had deposited was reused for oxidizing the impurities contained in a further part of the waste water. The hydrated dioxide of manganese applied was used altogether 18 times for the purification of waste water.

The determinations which were carried out in compliance with German standard methods, gave the average permanganate values, as follows:

(a) Untreated waste water: 1573 mg. $KMnO_4$/l. of waste water;
(b) Waste water treated according to the invention: 288 mg. $KMnO_4$/l. of waste water.

The average permanganate value thus decreased by 82%. The waste water treated in the aforesaid manner did not contain detectable amounts of manganese.

*Example 2*

Waste water discharged by a large solvents plant and containing as main impurities aliphatic esters and polyhydric alcohols was treated, in the same manner and under the same conditions as described in Example 1, with 25 grams of hydrated dioxide of manganese per liter of waste water. The oxidant recovered in each instance was used altogether 12 times.

The following average permanganate values were obtained:

(a) Untreated waste water: 3581 mg. $KMnO_4$/l. of waste water;
(b) Waste water treated according to the invention: 1039 mg. $KMnO_4$/l. of waste water.

The decrease of the average permanganate value thus amounted to 71%.

In the Examples 3 and 4 following hereunder, the process according to the invention was carried out in the same manner as described in Examples 1 and 2. However, in order to evaluate the purification effect there was determined not only the permanganate value but also the biological oxygen requirement ($BOD_5$).

Example 3

Waste water discharged by a petrochemical plant and containing as main impurities benzene and the homologs thereof was purified according to the process of the invention as described in Examples 1 and 2.

The following results were obtained (the $BOD_5$ values indicated signifying in this and in the following example in each instance mg. $O_2$/l. of waste water, and the $KMnO_4$ values signifying mg. $KMnO_4$/l. of waste water):

|  | Number of applications [1] | $BOD_5$ Before | $BOD_5$ After | Percent decrease | $KMnO_4$ Before | $KMnO_4$ After | Percent decrease |
|---|---|---|---|---|---|---|---|
| (a) 25 g. $MnO_2$/l | 10 | 400 | 300 | 25 | 1,751 | 242 | 86 |
| (b) 25 g. $MnO_2$+5 g. CuO/l | 10 | 950 | 42 | 95 | 1,679 | 222 | 87 |

[1] Of $MnO_2$ reoxidized in each instance.

The values indicated represent the respective average values of all tests performed.

Example 4

Instead of the type of waste water used in the preceding examples there was treated waste water discharged by a solvents plant and containing as main impurities aliphatic esters and polyhydric alcohols. The test conditions were analogous to those of the preceding examples. The results obtained are enumerated in the following table:

| $BOD_5$ | Number of applications [1] | $BOD_5$ Before | $BOD_5$ After | Percent decrease | $KMnO_4$ Before | $KMnO_4$ After | Percent decrease |
|---|---|---|---|---|---|---|---|
| (a) 25 g. $MnO_2$/l (10 minutes treatment time) | 5 | 1,251 | 1,081 | 13 | 2,071 | 433 | 79 |
| (b) 25 g. $MnO_2$/l+5 g. CuO (10 minutes treatment time) | 5 | 2,750 | 1,462 | 47 | 3,519 | 705 | 80 |

[1] Of $MnO_2$ reoxidized in each instance.

It results from the preceding Example 3 that the addition of cupric oxide which dissolves in the acid oxidation stage to yield a soluble cupric compound promotes the oxidation of the biological oxygen-consuming substances to a considerable extent. The somewhat reduced action of the cupric oxide added according to this example is due to the nature of the waste water which differs from that of the waste water used in Example 3.

Example 5

Waste water containing phenol was treated with 25 grams $MnO_2$/l. under the same conditions as indicated in the preceding examples. The number of applications of $MnO_2$ reoxidized in each instance was 3.

The following results were obtained:

| Throughput | Phenol. mg./l. Before | Phenol. mg./l. After | Decrease, Percent |
|---|---|---|---|
| 1 | 1,500 | 14 | 99 |
| 2 | 1,500 | 17 | 99 |
| 3 | 1,500 | 13 | 99 |

Example 6

Test portions of waste water of the same type as that used in Example 1, which were taken at different times, were treated altogether 7 times with 25 g. cerium dioxide per liter of waste water under conditions which were analogous to those of the preceding examples.

The following average permanganate values were obtained:

(a) Untreated waste water: 2034 mg. $KMnO_4$/l. of waste water;
(b) Waste water treated according to the invention: 519 mg. $KMnO_4$/l. of waste water.

The decrease of the permanganate value thus mounted to 74%.

Cerium could not be detected in the waste water treated according to the invention.

Example 7

Waste water of the same type as that used in Example 1 was treated with 5 grams of lead dioxide per liter of waste water under the same conditions as those applied in the preceding examples. In this case, however, reoxidation of Pb (II) into $PbO_2$ was effected, instead of by air, by means of 25 ml. of a 10% sodium hypochlorite solution (calculated on $PbO_2$) and by boiling the solution for about 15 minutes.

The following average permanganate values were obtained:

(a) Untreated waste water: 1703 mg. $KMnO_4$/l.;
(b) Waste water treated according to the invention: 472 mg. $KMnO_4$/l.

The decrease of the permanganate value thus amounted to 72%.

Lead could not be detected in the waste water treated.

We claim:

In a process for the purification of waste water by oxidative decomposition of dissolved oxidizable impurities therein by contacting said waste water with manganese dioxide to oxidize said impurities and to reduce the manganese in said manganese dioxide to a lower valence state, the improvement which comprises contacting 1 to 50 grams of manganese dioxide, per liter of waste water, with said waste water in the presence of from about 0.5 gram to about 10 grams, per liter of waste water, of a member selected from the group consisting of copper oxide and a soluble cupric compound at a pH of from 1 to 3, reprecipitating manganese dioxide from the resultant mixture by treatment thereof with an oxidizing agent at a pH of from 8 to 10, recovering said reprecipitated manganese dioxide, and contacting additional waste water with said recovered manganese dioxide in the presence of from about 0.5 gram to about 10 grams, per liter of waste water, of a member selected from the group consisting of copper oxide and a soluble cupric compound.

References Cited

UNITED STATES PATENTS

| 2,132,592 | 10/1938 | Wells et al. | 210—50 X |
| 2,879,134 | 3/1959 | Halpern | 23—145 X |

FOREIGN PATENTS 291    1869    Great Britain.

OTHER REFERENCES

Palache, C., et al.: The System of Mineralogy, vol. I, seventh edition, 1963, John Wiley and Sons, Inc., New York, pp. 562–566.

MORRIS O. WOLK, *Primary Examiner.*

MICHAEL E. ROGERS, *Examiner.*